(12) United States Patent
Findeisen

(10) Patent No.: US 8,769,505 B2
(45) Date of Patent: Jul. 1, 2014

(54) EVENT INFORMATION RELATED TO SERVER REQUEST PROCESSING

(75) Inventor: Piotr Findeisen, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 13/012,457

(22) Filed: Jan. 24, 2011

(65) Prior Publication Data

US 2012/0192004 A1    Jul. 26, 2012

(51) Int. Cl.
  *G06F 9/44* (2006.01)
(52) U.S. Cl.
  USPC .......... 717/130; 717/127; 717/128; 717/131; 717/158
(58) Field of Classification Search
  USPC .................. 717/127, 128, 130, 131, 148, 158
  See application file for complete search history.

(56) References Cited

U.S. PATENT DOCUMENTS

| | | | | |
|---|---|---|---|---|
| 5,671,417 | A * | 9/1997 | Miclette et al. | 717/130 |
| 5,758,061 | A * | 5/1998 | Plum | 714/35 |
| 6,961,930 | B1 * | 11/2005 | Waldspurger et al. | 717/141 |
| 7,398,518 | B2 * | 7/2008 | Dichter | 717/127 |
| 7,426,731 | B2 * | 9/2008 | Findeisen | 718/104 |
| 7,774,784 | B2 * | 8/2010 | Fields et al. | 718/104 |
| 8,019,860 | B2 * | 9/2011 | Ivanov et al. | 709/224 |
| 8,166,463 | B2 * | 4/2012 | Gill et al. | 717/130 |
| 8,196,119 | B2 * | 6/2012 | Gill et al. | 717/130 |
| 8,286,139 | B2 * | 10/2012 | Jones et al. | 717/128 |
| 8,291,399 | B2 * | 10/2012 | Li et al. | 717/158 |
| 8,359,582 | B2 * | 1/2013 | Elliott | 717/130 |
| 2009/0157359 | A1 * | 6/2009 | Chernoff | 702/186 |
| 2009/0172653 | A1 * | 7/2009 | Elliott | 717/148 |

OTHER PUBLICATIONS

Oracle. Debug Multithreaded Applications Quickly and Easily with Powerful Analysis Tools. Product Brief. 2011.*
Zheng et al. Static Detection of Resource Contention Problems in Server-Side Scripts. IEEE. 2012.*
Bartosz Balis, et al., "Monitoring Threaded Application with Thread-Enabled OMIS Monitor," Computer Science, Parallel Processing and Applied Mathematics, Lecture Notes in Computer Science, 2004, vol. 3019/2004, 331-337.
Mitch Tulloch, "Key Performance Monitor Counters," Windows Networking.com, Articles & Tutorials:: Windows 2003, May 10, 2005.

* cited by examiner

*Primary Examiner* — Matthew D Spittle

(57) ABSTRACT

A method disclosed herein provides for receiving information relating to an event that occurred while processing server request from a compiled code snippet inserted into a compiled computer program, calculating diagnostic information relating to execution of the server request based on the received information, and providing the diagnostic information. Alternatively, a computer-readable medium, storing a set of instructions, is provided for, the instructions, when executed by a processor perform a method including, while a server request is being executed, receiving information from a compiled code snippet, in inserted into a compiled computer program, the received information relating to a thread starting to process the server request. Alternatively, an apparatus is provided to receive information from a plurality of compiled code snippets, inserted into a compiled computer program, the received information relating to a plurality of threads processing a server request and storage to store the received information.

17 Claims, 5 Drawing Sheets

EVENT INFORMATION RELATED TO SERVER REQUEST PROCESSING

BACKGROUND

During execution of server side applications, a server request may be executed by one or more threads. It may be desirable to monitor execution of the server request, especially where there may be unduly long latency in processing the server request. However, where multiple threads are executing the server request, it is difficult to determine where the latency occurs.

DRAWINGS

DETAILED DESCRIPTION

A server request may be work that a device or system has to perform upon receiving an external trigger, such as input. In accordance with certain systems, when a server request is to be executed, server requests may not be executed by a single thread. They may be executed by several threads. For example, one thread is responsible for reading the request from the network and then configures the request in an internal data structure which is passed to another thread. The other thread takes the request and performs the actions prescribed by the application and creates a response which is stored in another data structure. There can be a third thread which reads from the external data structure and reports back to the originating client. By organizing applications this way, an increase of maximum throughput may be appreciated and a memory footprint may be reduced. Threads are relatively expensive so the smaller number of threads, the less expensive the system is. Where server requests are performed by a single thread from start to finish, the thread may be idle for some part of the process because it had to wait for subrequests of the server request.

By providing for the ability to utilize multiple threads to execute a server request, when an application is waiting for a subrequest to be executed by a separate application, a thread may abandon or complete its processing of the server request to work on or process a different server request. However, in general, there is no way of knowing when a server request is being passed from one thread to another because there is no standard framework element that would support this activity.

By providing for compiled code snippets inserted into a compiled computer program, each of the compiled code snippets, as the server request is being processed, may notify an event information application (a monitoring tool) about when threads start and/or abandon or complete its processing of a server request. The notification may include information regarding the system at the time the thread starts or abandons (completes) its processing of the server request, e.g., a wall clock and/or a CPU clock documenting the time when the thread started or abandoned (completed) its processing of the server request. Based on this information included in the notification, diagnostic information may be calculated regarding the wall clock time and/or CPU time relating to the multi-threaded processing of the server request.

System Environment

Figure 1:
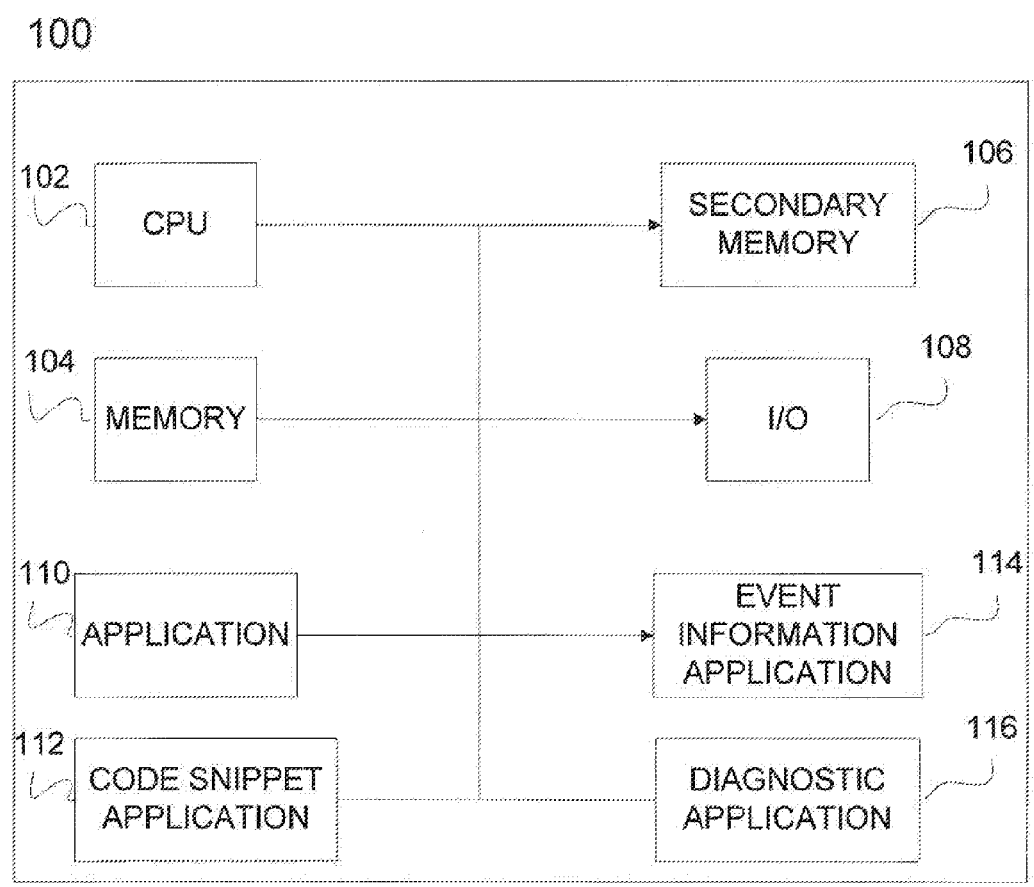
FIG. 1 depicts a block diagram of a device in accordance with an embodiment of the present disclosure.

FIG. 1 is an example block diagram of a device 100 for implementing the principles consistent with some embodiments of the present disclosure. The components of device 100 may be implemented through any suitable combinations of software including machine readable instructions, firmware, including machine readable instructions, and/or hardware. Although all of the components are depicted in FIG. 1 as being within one device 100, it may be appreciated that one or more of the components depicted in FIG. 1 may be located at separate, communicably-linked devices within a network.

As shown in FIG. 1, device 100 includes central processing unit (CPU) 102, memory 104 and secondary memory 106. Secondary memory may be implemented within device 100 and/or may be implemented as external data storage. Device 100 may further include input/output devices 108 and application 110.

Application 110 may be implemented as a software application, including machine readable instructions, stored on a computer-readable medium, and executed on a computing device, for example, a server. Application 110 may be configured to process one or more server requests received from one or more other applications within device 100 or from a device external to device 100.

Application 110 may be stored in memory 104, secondary memory, 106, etc. Application 110 may be executed by CPU 102.

Device 100 may further include code snippet application 112. Code snippet application 112 may be implemented as a system for inserting compiled code snippets into compiled code blocks at a specified insertion point. Application 112 may be stored in memory 104, secondary memory, 106, etc. Application 112 may be executed by CPU 102.

in Device 100 may further include event information application 114. Event information application 114 may receive information from compiled code snippets inserted into compiled code blocks as one or more server requests are being processed. Event information application 114 may store the received information in secondary memory 106. Based on the information stored in event information application, diagnostic information regarding executed of one or more server requests may be generated. Event information application 114 may be stored in memory 104, secondary memory, 106, etc. Event information application 114 may be executed by CPU 102.

Device 100 may further include diagnostic application 116. Diagnostic application 116 may access event information stored in secondary memory 106 in order to calculate diagnostic information relating to the execution of server requests. Diagnostic application 116 may be stored in memory 104, secondary memory, 106, etc. Diagnostic application 116 may be executed by CPU 102.

Code Snippet Application

An illustrative mechanism to add functionality to an application program or application class as the program is running is disclosed with respect to code snippet application 112. The mechanism adds functionality by fetching code, herein designated a before-compiled code snippet, and compiling the before-compiled code snippet to generate a compiled code snippet. The compiled code snippet is then inserted into a block of compiled code at a specified location, herein designated the insertion point. Preferably, the compiled code snippet is inserted into the compiled code block as the code block is running, i.e., at runtime. Preferably, the before-compiled code snippet is also compiled at runtime, just prior to being inserted into the compiled code block, in a so-called just-in-time compiling action.

The location of the high level code of the before-compiled code snippet can be identified in a file, herein designated a configuration file. The configuration file can comprise the before-compiled code. Alternatively, the before-compiled code can exist at another location known to the configuration file, such as in a separate file whose filename and path are known to the configuration file, for example by being specified in the configuration file.

The before-compiled code is compiled in a compiler, in a manner known by those of skill in the art. The compiler can generate a select type of compiled code, such as bytecode, or other machine-readable code, such as native code. In an embodiment, the before-compiled code can comprise high-level code such as JAVA™ code, although other high-level code can be used.

The compiled code is inserted into the running application at a select location, herein designated the insertion point. The insertion point can be indicated, for example, by an indicator in the configuration file.

In an example implementation, a user can put a few lines of Java code in a configuration file, to add desired functionality to an existing application or application class. An application, such as a code snippet application 112, can fetch the Java code, compile the Java code to generate compiled Java code such as bytecode, insert the bytecode into a bytecode block of the application class at an insertion point indicated in the configuration file, and thereby add the desired functionality to the class. Preferably, the code snippet can be compiled and inserted into the application class at runtime, thereby adding functionality to an already loaded application or application class. For example, the ability to capture select data can be added to an already loaded application or application class, at runtime.

In an example implementation, a code snippet application can be modified. A Java code snippet application is an application that is configured to start in a user's Java-based application using modified configuration scripts. After the code snippet application starts up it can instrument Java classes as they're loaded into the user's application. The code snippet application can be modified in accordance with the configuration file by compiling a Java code snippet into bytecode, and inserting the code snippet bytecode into a block of compiled bytecode of a Java class as the class is loaded, or, after the class is loaded, in order to add new functionality to the event information application. The point in the Java application 110 bytecode at which the compiled code snippet bytecode is inserted can be indicated in the configuration file. For example, the inserted bytecode can call back into the event information application 114 and enable capturing of data with regard to new types of performance events as they happen. Illustratively, the event information application 114 can then store the captured data in secondary memory 106, where it can later be aggregated, correlated, and manipulated as desired, such as for display to the user.

In an embodiment, the configuration file can work in conjunction with another file, herein designated the points file. The points file comprises a list of definitions of what functions to instrument, and what to do to capture data at a desired point. In an example implementation, the points file can indicate parameters, including but not limited to class name, method name, and signature, to specify how to instrument that particular class method, and what to do to capture data from that location.

Figure 2:
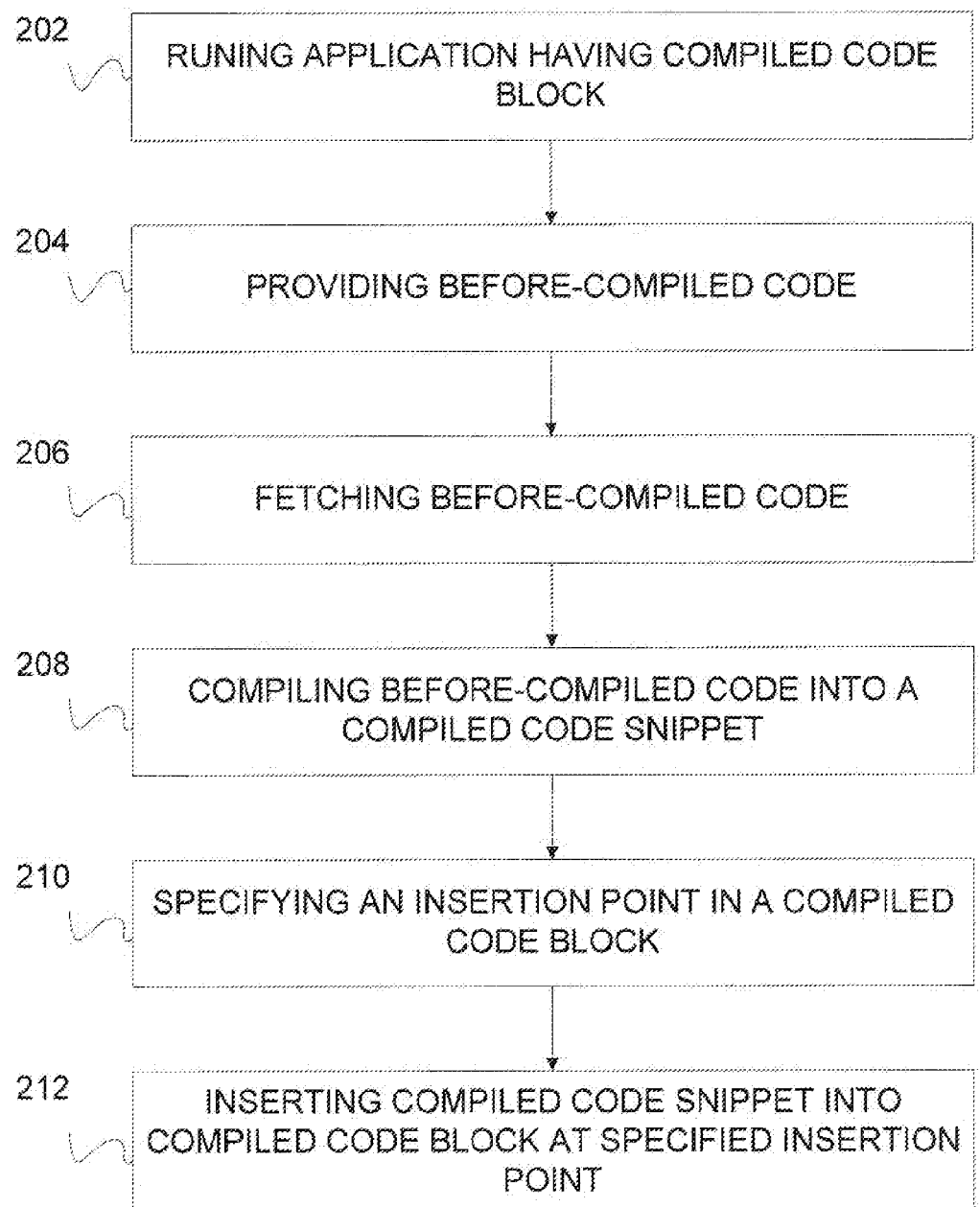
FIG. 2 depicts a block diagram showing a code snippet application for inserting a compiled code snippet into a compiled code block at a specified insertion point, in accordance with an embodiment of the present disclosures.

Referring now to FIG. 2, shown is a block diagram illustrating a method of inserting a compiled code snippet into a compiled code block at a specified insertion point. As shown in FIG. 2, an application or application class comprising a compiled code block is run (202). The compiled code may comprise bytecode, or it may comprise other compiled code, such as code that can readily be executed by a machine (a computer), e.g., native code. The compiled code may be being loaded, or may already be running. Before-compiled code is provided (204), such as in a configuration file, or in a file known to the configuration file. The before-compiled code is fetched (206), such as from a location indicated in the configuration file, either from the configuration file itself, or from a location indicated in the configuration file. The fetched before-compiled code is compiled into a compiled code snippet (208), using a compiler for example. An insertion point in a compiled code block of the application or application class is specified (210). The compiled code snippet is inserted into the compiled code block at the specified insertion point (212), thereby modifying the application or application class.

Figure 3:
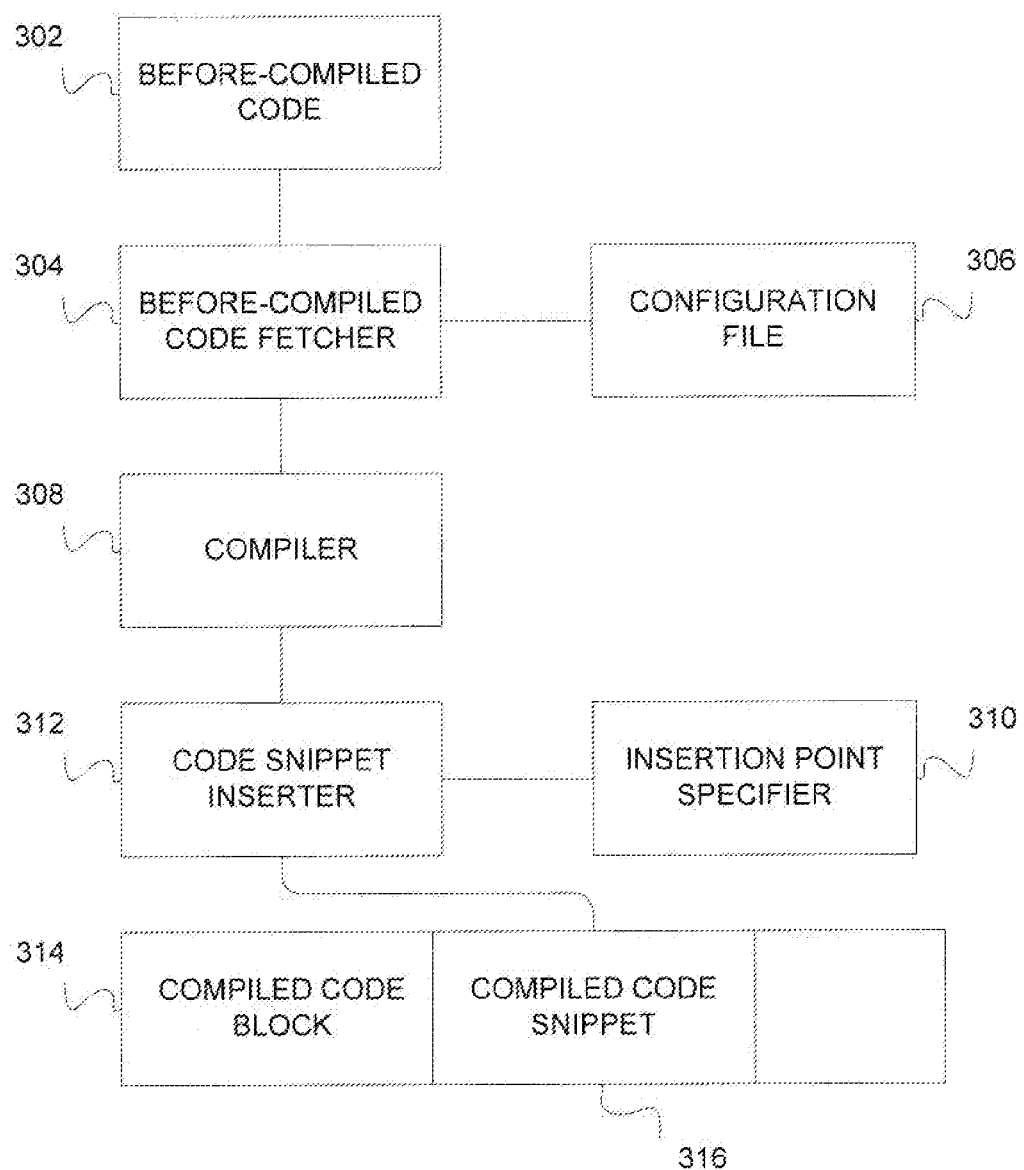
FIG. 3 depicts a block diagram showing a system for inserting a compiled code snippet into a compiled code block at a specified insertion point, in accordance with an embodiment of the present disclosure.

Referring now to FIG. 3, shown is a block diagram illustrating a system for inserting a compiled code snippet into a compiled code block at a specified insertion point. Before-compiled code is provided (302), such as in a file. The before-compiled code can comprise, for example, lines of high-level computer code. The before-compiled code is fetched by a code fetcher (304), in accordance with instructions contained, for example, in a configuration file (306). In one embodiment, the configuration file can also comprise the before-compiled code. The code fetcher retrieves the before-compiled code, and provides it to a compiler (308), where it is compiled into a compiled code snippet, comprising, for example, bytecode or native code. An insertion point specifier (310) specifies an insertion point in a compiled code block of an application or application class, at which to insert the compiled code snippet. The configuration file (306) can comprise the insertion point specifier. A code snippet inserter (312) inserts the compiled code snippet (316) into the compiled code block (314) of the application or application class at the insertion point specified by the insertion point specifier (310). Thereby, the application or application class is modified during runtime.

Illustratively, the ability to specify arbitrary Java code that can be compiled into bytecode and inserted into application classes at runtime can provide the ability to change the data being captured on-site by the event information application 114, without any costly or time-prohibitive product changes. A few lines of Java code can add the same functionality as provided in the prior art by several full java classes to manually affect bytecode instrumentation. In addition, users can also add their own variables for use later in the code snippet.

In an example implementation, different users of the compiler can provide their own pre-set variables for use by a snippet. Appropriate type checking and exception handling can also be added around the code snippet so that any mistakes in the snippet will not cause any behavior changes in either the event information application 114 or the application 110.

In an example implementation, the Java language syntax supported by the code snippet compiler is a subset of the full Java language to ensure that the added code snippet can be inserted into an application safely. This can result in benefits with regard to the complexities involved around operand stack management, exception handling, and runtime type identification.

In an example implementation, the code snippet compiler can support casting various variables, i.e., changing the variable type if needed. The snippet compiler can also support return values in the snippet, such as to aid the compiler in identifying the runtime type to use when generating the bytecode. The casting mechanism can assist the compiler in identifying the proper bytecodes to use. The casting mechanism can also help avoid the use of reflection, which can cause undesirable runtime performance overhead.

Advantages of the use of Java code snippets over the prior art can include the ability to write only a few lines of Java code whereby the compiler will automatically compile them to bytecode and insert the bytecode in the proper location in an already compiled block of bytecode.

Additional advantages of using code snippets in accordance with the claims can include one or more of the following, especially when used in conjunction with a Java-based application. There can be less processing overhead than prior art practices, for example, in instrumentation. In addition, the Java Reflection API need not be used to call arbitrary methods in application code as required in prior art practices. Furthermore, the code snippet can be just-in-time (JIT) compiled to bytecode upon the first invocation of the application class into which the code snippet is inserted. In this way, the code snippet can be incorporated into the class as fast as the class invocation can be made, effectively as though the code snippet had been included in the original class. Furthermore, the Java Runtime's JIT compiler can further compile the Java bytecode to machine instructions, thereby making the code snippet optimal speed for all practical purposes.

An additional benefit of using code snippets is that it can make ordinary application code easier to maintain. For example, instead of having many classes, such as Java application classes, to write, test, and maintain fewer lines of code can be used in conjunction with pre-built code snippets. Furthermore, vendor maintenance may not be necessary for any user-written code snippets.

Code snippets can also provide a way for an event information application to obtain access to data that it is isolated from due to complex ClassLoader issues. For example, if only prior art practices are used, the event information application cannot make API calls directly to objects loaded in other ClassLoaders.

Code snippets can be secured to control deployment and prevent mis-use of the snippet capabilities. For example, since code snippets can call arbitrary application code, an extra level of security may be desired in order to control how they are used. In an example implementation, security can be provided to prevent remote modification of code snippets, and/or to lock the permissions on files associated with code snippets to only those who have permissions to change or create code snippets. In addition, or alternatively, a security hash can be used to validate that the code snippet being compiled is the same code snippet written by the author, without any changes.

Server Request Processing

Figure 4:
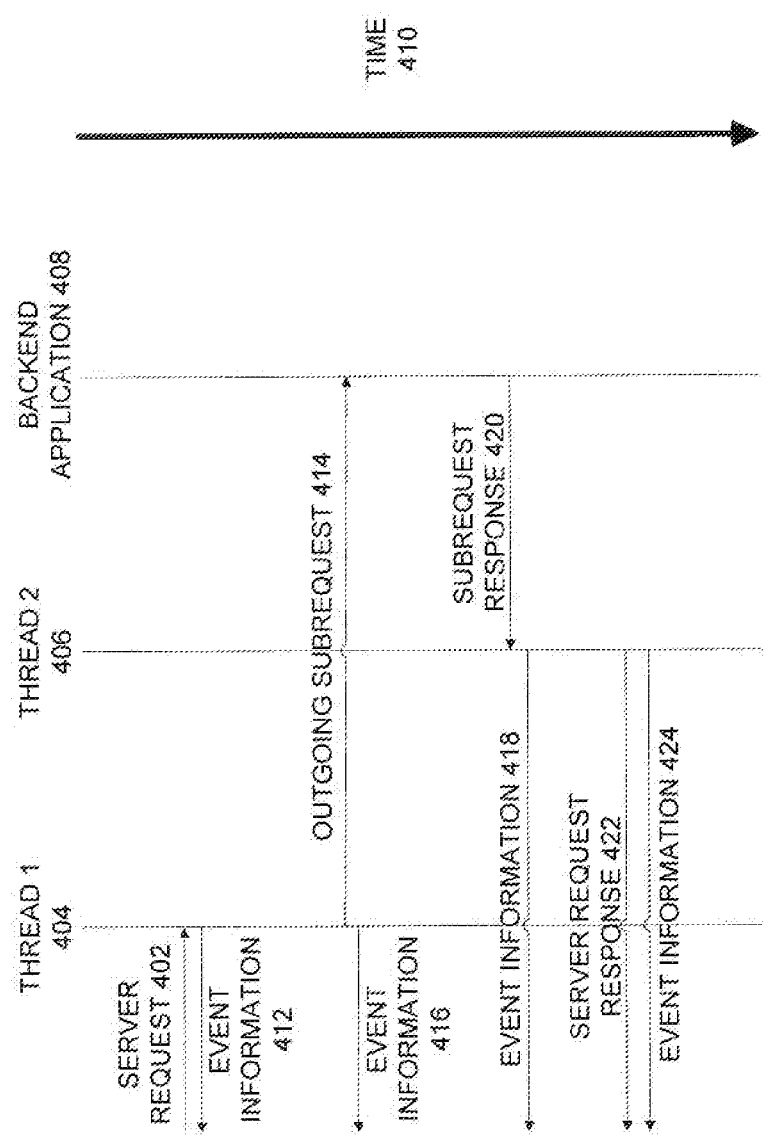
FIG. 4 depicts a process of executing a request, in accordance with an embodiment of the present disclosure.

FIG. 4 depicts a diagram showing example of execution of a server request. Specifically, FIG. 4 depicts processing of a server request 402 by thread 1 404, thread 2 406 and backend application 408 as time 410 passes in the direction of the arrow. As can be seen in FIG. 4, application 110 (FIG. 1) executes an application and a server request 402 is received. Thread 1 404 is assigned from a thread pool (not shown) to process the server request 402. At the time thread 1 404 received the server request 402, a code snippet previously inserted into the application communicates event information 412, a server request start event, to event information application 114 indicating that thread 1 404 has started to process server request 402. The event information may include one or more of thread 1 404 identification information, information indicating thread 1 404 has started processing server request 402, server request 402 identification information, a wall clock time representing the actual time of the system at the time thread 1 404 has started processing server request 402, a CPU start time representing the start of the CPU processing time of the server request 402 by thread 1 404, etc. Event information application 114 receives event information 412 and stores the event information associated with the server request 402.

In the example depicted in FIG. 4, thread 1 404 processes server request 402 until such time as thread 1 404 determines a subrequest to the server request 402 must be processed. Thread 1 404 transmits outgoing subrequest 414 to backend application 408. Instead of continuing to be assigned to server request 402 and remaining idle as the subrequest is being processed by backend application 408, thread 1 404 completes its processing of the server request 402 and transmits event information 416, a server request pause event, to event information application 114. A server request pause event may be an event, such as a need to process a subrequest, which pauses the processing of the server request. Event information 416 may include one or more of the thread 1 404 identification information, information indicating thread 1 404 has completed processing server request 402, server request 402 identification information, outgoing subrequest 414 identifying information, a wall clock time representing the time thread 1 404 had completed processing the server request 402, a CPU end time representing the end of the CPU processing time of the server request 402 by thread 1 404, etc. Thread 1 404 detaches itself from the server request 402. Thread 1 404 returns itself to a thread pool where thread 404 may be immediately made available to handle a different server request.

Backend application 408 processes the subrequest. During the time the backend application 408 processes the subrequest, there is no thread within application 110 associated with the server request 402. Backend application 408, upon completing processing of the subrequest, sends subrequest response 420 to thread 2 406, a new thread assigned from the thread pool to continue processing server request 402. It may be appreciated that thread 2 406 may be the same thread as thread 1 404, or a different thread assigned to process the server request 402. At the time thread 2 406 is assigned to process original subrequest 402, a code snippet previously inserted into the application communicates event information 418, a server request resume event, to event information application 114 indicating that thread 2 406 has started to process server request 402. The server request resume event may be completion of the processing of the subrequest where the server request processing may be resumed. The event information may include one or more of thread 2 406 identification information, information indicating thread 2 406 has started processing server request 402, server request 402 identification information, subrequest identifying information, a wall clock time representing the actual time of the system at the time thread 2 406 has started processing server request 402, a CPU start time representing the start of the CPU processing time of the server request 402 by thread 2 406, etc. Event information application 114 receives event information 418 and stores the event information associated with server request 402.

Upon receiving a subrequest response 420, thread 2 406 processes the server request 402 and, upon completion of the processing of the server request 402, sends server request response 422 back to the server request issuing party. Thread 2 406 may transmit event information 424, a server request end event, to event information application 114. Event information 424 may include one or more of the thread 2 406 identification information, information indicating thread 2 406 has completed processing server request 402, server request 402 identification information, a wall clock time representing the time thread 2 406 had completed processing the server request 402, a CPU end time representing the end of the CPU processing time of the server request 402 by thread 2 406, etc. Thread 2 406 detaches itself from the server request 402 and completes the processing of the server request 402. Thread 2 406 returns itself to a thread pool where thread 2 406 may be immediately made available to handle a different server request. Event information application 114 receives event information 424 and stores the event information 424 associated with server request 402

Once a server request has been completed, diagnostic information may be generated based on event information stored in event information application 114. Diagnostic information may relate to processing of the server request, for example, the overall time taken to process the server request based on the stored wall clock time, the overall CPU processing time of the server request, how long processing of a server request was paused, how many different threads were used to process the server request, etc. In addition, latency information related to each of the threads processing the server request, for example, for each thread processing the server request, the diagnostic information may include the time taken to process the server request based on the stored wall clock time, the CPU processing time of the server request, etc.

Figure 5:
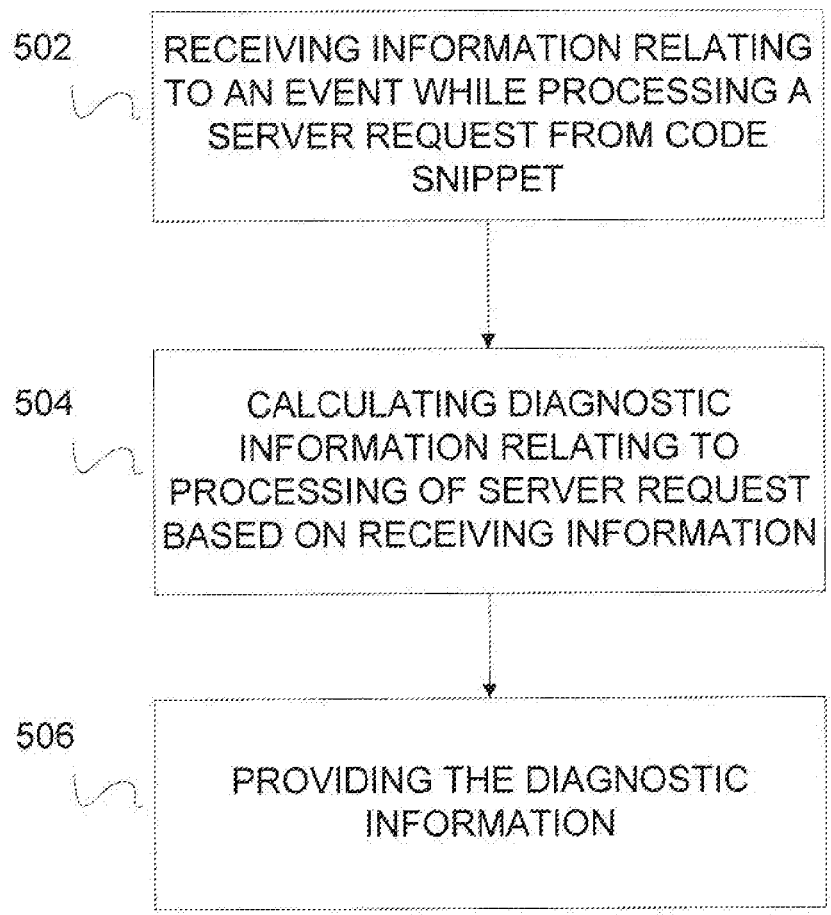
FIG. 5 depicts a flow diagram of a method for calculating diagnostic information, according to an embodiment of the present disclosure.

FIG. 5 depicts a flow diagram representing a method for providing diagnostic information for processing of a server request. As shown in FIG. 5, information is received relating to an event while processing a server request sent from a code snippet (502). The information may be received at event information application 114. The event may relate to the thread starting or completing processing of a server request. The event may be a server request start event, a server request pause event, a server request resume event, a server event end request, etc. When sending the event information, the system may determine a wall clock in time and a CPU clock time at the time the thread starts, pauses, resumes, or ends processing of the server request. This information may be included in the information that is received at event information application 114. The event information may be associated with the server start request and stored in memory 104, 106, etc.

Diagnostic information may be calculated relating to the processing of the server request based on the received information from the code snippet (504). The diagnostic information may then be provided to a device (506). The diagnostic information may be, for example, output on a display device (not shown); transmitted to a remote device, example, a system administrator; stored for later retrieval; etc.

I claim:

1. A method, comprising:
   processing a server request using a computer program containing a compiled code snippet inserted at a point in the computer program specified by an indicator in a configuration file from which the code snippet was compiled;
   receiving, from the compiled code snippet in the computer program, information relating to a first event that occurred while processing the server request, wherein the first event is a server request start event indicating a thread started processing the server request;
   receiving information relating to a second event that occurred while processing the server request from the compiled code snippet, the second event being a thread completing its processing of the server request based on a sub-processing request;
   calculating diagnostic information relating to execution of the server request based on the received information; and
   providing the diagnostic information.

2. The method of claim 1, further comprising:
   determining a wall clock time of the server request start;
   determining a CPU clock time of the server request start; and
   storing the received information by associating the determined wall clock time and the determined CPU clock time with the server request start.

3. The method of claim 1, further comprising:
   receiving information relating to a server request end event indicating the server request processing has been completed.

4. The method of claim 3, further comprising:
   determining a wall clock time of the server request end;
   determining a CPU clock time of the server request end; and
   storing the received information by associating the determined wall clock time of the server request end and the determined CPU clock time with the server request end.

5. The method of claim 1, further comprising:
   determining a wall clock time of the second event;
   determining a CPU clock time of the second event; and
   storing the received information by associating the determined wall clock time of the server request end and the determined CPU clock time with the second event.

6. The method of claim 1, further comprising:
   receiving information relating to a third event that occurred while processing the server request from the compiled code snippet, the third event being a thread picking up processing of the server request after completion of the sub-processing request.

7. The method of claim 6, further comprising:
   determining a wall clock time of the third event;
   determining a CPU clock time of the third event; and
   storing the received information by associating the determined wall clock time of the server request end and the determined CPU clock time with the third event.

8. The method of claim 1, wherein the diagnostic information is latency information regarding the processing of the server request or latency information regarding CPU time used in processing the server request.

9. A non-transitory computer-readable storage medium, storing a set of instructions that when executed by a processor causes the processor to:
   process a server request using a computer program containing a compiled code snippet inserted at a point in the computer program specified by an indicator in a configuration file from which the code snippet was compiled;
   while the server request is being processed, receive information relating to a first event from the compiled code snippet in the computer program, the received information relating to the first event being a thread starting to process the server request; and while the server request is being processed, receive information relating to a second event from the compiled code snippet, the second event being a thread completing its processing of the server request based on a sub-processing request.

10. The non-transitory computer-readable storage medium of claim 9, wherein the received information relating to the first event includes a wall clock time and a CPU clock time of the thread starting processing of the server request.

11. The non-transitory computer-readable storage medium of claim 9, wherein the received information relating to the second event includes a wall clock time and a CPU clock time of the thread completing its processing of the server request.

12. The non-transitory computer-readable storage medium of claim 11, wherein the set of instructions further causes the processor to:
receive information from one or more additional compiled code snippets in the computer program, the received information relating to one or more subsequent threads starting to process or completing the processing of the server request.

13. The non-transitory computer-readable storage medium of claim 12, wherein the diagnostic information is latency information regarding processing of the server request or latency information regarding CPU time used in processing the server request based on the received information relating to the thread and the one or more subsequent threads.

14. The non-transitory computer-readable storage medium of claim 9, wherein the set of instructions further causes the processor to:
calculate diagnostic information relating to the processing of the server request based on the information received from the compiled code snippets; and
provide the diagnostic information.

15. An apparatus, comprising:
a processor; and
a memory to store a set of instructions that when executed by the processor causes the processor to:
process a server request using a computer program containing a compiled code snippet inserted at a point in the computer program specified by an indicator in a configuration file from which the code snippet was compiled;
receive event information relating to a first event from the compiled code snippet in the computer program, the received information relating to the first event being a thread starting to process the server request; and
while the server request is being processed, receive information relating to a second event from the compiled code snippet, the second event being a thread completing its processing of the server request based on a sub-processing request.

16. The apparatus of claim 15, wherein the received information relating to the first event and the second event includes a wall clock time and a CPU clock time of the thread starting to process and completing processing of the server request, respectively.

17. The apparatus of claim 16, wherein the set of instructions further causes the processor to:
calculate diagnostic information relating to the processing of the server request based on the received information relating to the threads, the diagnostic information being related to latency information regarding the processing of the server request or latency information regarding CPU time used in processing the server request; and
provide the calculated diagnostic information.

\* \* \* \* \*